United States Patent [19]
Cohnen et al.

[11] Patent Number: 4,552,911
[45] Date of Patent: Nov. 12, 1985

[54] POLYCARBONATE MOLDING COMPOSITIONS HAVING IMPROVED FLAME RETARDANCE

[75] Inventors: Wolfgang Cohnen; Klaus Kircher; Peter R. Müller, all of Leverkusen, Fed. Rep. of Germany; Sivaram Krishnan; Dieter Neuray, both of New Martinsville, W. Va.

[73] Assignee: Bayer Aktiengesellschaft, Leverkusen, Fed. Rep. of Germany

[21] Appl. No.: 462,152

[22] Filed: Jan. 28, 1983

[30] Foreign Application Priority Data

Feb. 5, 1982 [DE] Fed. Rep. of Germany ....... 3203905

[51] Int. Cl.$^4$ .......................... C08K 5/34; C08K 3/10; C08K 5/56
[52] U.S. Cl. ..................................... 524/94; 524/166; 524/174; 524/341; 524/494
[58] Field of Search ................. 524/94, 166, 174, 341, 524/494; 528/174, 219

[56] References Cited

U.S. PATENT DOCUMENTS

| 3,775,367 | 11/1973 | Nouvertne | 524/165 |
|---|---|---|---|
| 3,855,277 | 12/1974 | Fox | 524/409 |
| 3,875,107 | 4/1975 | Nouvertne et al. | 528/174 |
| 3,919,167 | 11/1975 | Mark | 524/84 |
| 4,110,299 | 8/1978 | Mark | 524/84 |
| 4,185,009 | 1/1980 | Idel et al. | 524/165 |
| 4,208,489 | 6/1980 | Schmidt et al. | 524/94 |
| 4,223,100 | 9/1980 | Reinert | 525/146 |
| 4,303,575 | 12/1981 | Reinert | 524/112 |

FOREIGN PATENT DOCUMENTS

| 2918882 | 5/1979 | Fed. Rep. of Germany . |
| 50-64337 | 5/1975 | Japan . |
| 50-119041 | 9/1975 | Japan . |
| 1573457 | 8/1980 | United Kingdom . |

Primary Examiner—John Kight
Assistant Examiner—Kriellion Morgan
Attorney, Agent, or Firm—Gene Harsh; Lawrence S. Pope; Aron Preis

[57] ABSTRACT

The present invention relates to polycarbonate molding compositions containing additives of alkali or alkaline earth metal salts, tetrahalogenophthalimides and optional glass fibers, characterized in that they contain additive amounts of bromine.

4 Claims, No Drawings

POLYCARBONATE MOLDING COMPOSITIONS HAVING IMPROVED FLAME RETARDANCE

FIELD OF THE INVENTION

The invention concerns molding compositions and more particularly polycarbonate compositions having an improved level of flame resistance.

SUMMARY OF THE INVENTION

The present invention relates to polycarbonate molding compositions comprising 1. a branched, thermoplastic aromatic polycarbonate,
2. an alkali or alkaline earth metal salt of an organic or an inorganic acid in the amounts of 0.01 to 1% by weight, relative to the weight of the total composition,
3. tetrahalogenophthalimides of the general formula I or II

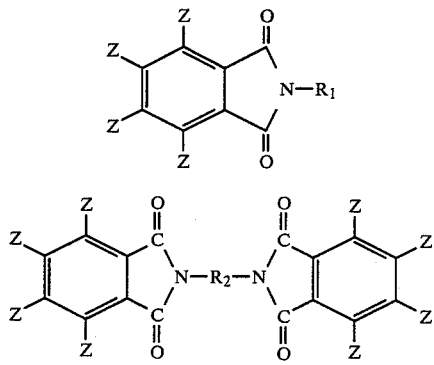

wherein $R_1$ is H, $C_1$–$C_4$-alkyl, $C_6H_5$, $C_{10}H_7$, $C_6H_4X$, $C_6H_3X_2$ or $C_6H_2X_3$ wherein X is chlorine or bromine, and wherein $R_2$ is a bond, $C_2$–$C_8$ alkylene, $C_6H_4$ or p-diphenylene,
and wherein Z is Cl or Br, in amounts of 0.05 to 5% by weight, relative to the weight of the total composition, and 4. optionally, 1 to 40% by weight relative to the weight of the composition of glass fibers, which compositions are further characterized in that they additionally contain 0.1 to 7%, preferably 0.5 to 7%, by weight, of bromine obtained either by condensing into the thermoplastic aromatic polycarbonate monomeric compounds containing aromatically bonded bromine or by admixing low molecular weight bromine compounds with the thermoplastic aromatic polycarbonate.

BACKGROUND OF THE INVENTION

The addition of alkali metal salts or alkaline earth metal salts of inorganic or organic acids (see, for example, DE-OS [German Published Specification] No. 1,930,257 (LeA 12,278) or DE-OS [German Published Specification] No. 2,149,311 (LeA 13,999)), if appropriate in combination with halogen compounds and glass fibers (see, for example, DE-OS [German Published Specification] No. 2,148,598 (LeA 13,970)), is known.

The addition of halogenated, low molecular weight aromatic polycarbonates and if appropriate inorganic or organic antimony compounds to thermoplastic resins, for example, thermoplastic polycarbonates (see DE-OS [German Published Specification] No. 2,243,226) is also known.

The use of halogenated phthalimides with the stated alkali metal salts and if appropriate perfluoroethylene (see DE-OS [German Published Specification] No. 2,703,710 (LeA 17,759) and U.S. Pat. No. 4,208,489) is also known.

Japanese Patent Publication No. 75-64337 also discloses that thermoplastic resins, for example, aromatic polycarbonates, may be provided with halogenated phthalimides and if appropriate other flameproofing auxiliaries, such as $Sb_2O_3$.

Japanese Patent Publication No. 75119401 also discloses that thermoplastic resins, for example, aromatic polycarbonates, may be provided with halogenated phthalimides and if appropriate, other flameproofing auxiliaries, such as $Sb_2O_3$, and if appropriate further additives, such as, for example, glass fibers.

Polycarbonates with a content of organic alkali metal salts and/or alkaline earth metal salts, characterized in that they contain an inorganic alkali metal halide or alkaline earth metal halide and/or an organic aromatic or heterocyclic halide, are also known. If appropriate, siloxanes, fluorinated polyolefins or glass fibers can also be added. However, tetrahalogenophthalimides are not included as organic halides (see DE-OS [German Published Specification] No. 2,744,016 together with U.S. patent specification No. 3,919,167).

Finally, mixtures of polycarbonates, organic halogen compounds, alkali metal salts or alkaline earth metal salts and substances which reduce the tendency of polycarbonates to drip (see DE-OS [German Published Specification] No. 2,918,882 and DE-OS [German Published Specification] No. 2,918,883) are also known.

Both halogenated phthalimides and the special bromine compounds can be employed as organic halogen compounds. However, it is not mentioned that the combinations, to be employed according to the invention, of halogen-containing polycarbonates or mixtures of polycarbonates with halogen-containing additives, halogenated phthalimides and alkali metal salts or alkaline earth metal salts of an organic acid have a synergistic effect in respect to the flame resistance of the molding composition.

Neither the combination salt, phthalimide and if appropriate glass fibers, nor the combination salt, special bromine compounds and if appropriate glass fibers stabilize the thermoplastic polycarbonates to such an extent that they do not tend to drip, even under extreme fire conditions.

DETAILED DESCRIPTION OF THE INVENTION

For the purposes of this invention, suitable branched, halogen-free, thermoplastic aromatic polycarbonates are homopolycarbonates and copolycarbonates which are based on, for example, one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl)-sulphoxides, bis-(hydroxyphenyl)-sulphones and α, α'-bis-(hydroxyphenyl)-diisopropylbenzenes.

Particularly preferred diphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The polycarbonates are branched by incorporating amounts between 0.05 and 2.0 mol % (relative to the diphenols employed) of trifunctional compounds or compounds which are more than trifunctional, for example those having three or more phenolic hydroxyl groups.

Polycarbonates of this type and their preparation are described, for example, in the German Offenlegungsschriften [German Published Specifications] Nos. 1,570,533, 1,595,762, 2,116,974 and 2,113,347, British patent specification No. 1,079,821, U.S. patent specification No. 3,544,514 and in the German Offenlegungsschrift [German Published Specification] No. 2,500,092.

Examples of compounds having three or more than three phenolic hydroxyl groups, which may be used are phloroglucinol, 4,6-dimethyl-2,4,6-tri-(4-hydroxyphenyl)-hept-2-ene, 4,6-dimethyl-2,4,6-tri(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2'-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-ortho-terephthalic acid esters, tetra-(4-hydroxy-phenyl)-methane, tetra-(4-(4-hydroxyphenyl isopropyl)-phenoxy)-methane and 1,4-bis-((4',4''-dihydroxytriphenyl)-methyl)-benzene. Some other trifunctional compounds are 2,4-dihydroxybenzoic acid, trimesic acid, cyanuric chloride, 3,3-bis-(4-hydroxyphenyl)-2-oxo-2,3-dihydroindole and 3,3-bis-(4-hydroxy-3-methylphenyl)- 2-oxo-2,3-di-hydroindole.

The aromatic polycarbonates should as a rule have a mean weight average molecular weight of from 15,000 to 200,000, preferably from 20,000 to 80,000, determined by measurements of the relative viscosity in $CH_2Cl_2$ at 25° C. and a concentration of 0.5 g per 100 ml.

To set the molecular weight of the polycarbonates, chain terminators, such as phenol or alkylphenols, are employed in a known manner and in known amounts.

Suitable alkali or alkaline earth metal salts of an organic or inorganic acid are preferably the sodium, potassium, lithium and calcium salts.

Preferred organic acids are the aliphatic sulphonic acids, the aromatic sulphonic acids, the aromatic carboxylic acids and the aliphatic carboxylic acids, such as, for example, trifluoromethanesulphonic acid, perfluorobutane sulphonic acid, perfluoro-octanesulphonic acid, dodecanesulphonic acid, benzene-sulphonic acid, 2,4,6-trichlorobenzenesulphonic acid, benzenedisulphonic acid, naphtholsulphonic acid, naphthol-disulphonic acid, 2-chlorobenzenesulphonic acid, octanoic acid, dodecanoic acid, benzoic acid, naphtholcarboxylic acid and 2,4,6-tribromobenzoic acid.

Preferred inorganic acids are $H_3AlF_6$, $H_3BF_6$, $H_3SbF_6$, $H_2TiF_6$, $H_2SiF_6$, $H_3PO_4$, $H_2ZrF_6$, $H_2WF_6$ and $HBF_4$.

Examples of suitable tetrahalogenophthalimides according to formula I are: tetrachlorophthalimide, N-methyl-tetralchlorophthalimide, N-ethyl-tetrachlorophthalimide, N-propyl-tetrachlorophthalimide, N-isopropyl-tetrachlorophthalimide, N-butyl-tetrachlorophthalimide, N isobutyl-tetrachlorophthalimide, N-phenyl-tetrachlorophthalimide, N-(4-chlorophenyl)-tetrachlorophthalimide, N-(3,5-dichlorophenyl)-tetrachlorophthalimide, N-(2,4,6-trichlorophenyl)-tetrachlorophthalimide, N-naphthyl-tetrachlorophthalimide, tetrabromophthalimide, N-methyl-tetrabromophthalimide, N-ethyl-tetrabromophthalimide, N-propyl-tetrabromophthalimide, N-isopropyl-tetrabromophthalimide, N-butyl-tetrabromophthalimide, N-isobutyl-tetrabromophthalimide, N-phenyl-tetrabromophthalimide, N-(4-chlorophenyl)-tetrabromophthalimide, N-(3,5-dichlorophenyl)-tetrabromophthalimide, N-(2,4,6-trichlorophenyl)-tetrabromophthalimide, N-naphthyl-tetrabromophthalimide.

For the purposes of the invention, the following may be mentioned as examples of suitable tetrahalogenophthalimides according to formula II: N,N'-ethylene-di-tetrachlorophthalimide, N,N'-propylene-di-tetrachlorophthalimide, N,N'-butylene-di-tetrachlorophthalimide, N,N'-p-phenylene-di-tetrachlorophthalimide, 4,4'-di-tetraphthalimidodiphenyl, N-tetrachlorophthalimido-tetrachlorophthalimide, N,N'-ethylene-di-tetrabromophthalimide, N,N'-propylene-di-tetrabromophthalimide, N,N'-butylene-di-tetrabromophthalimide, N,N'-p-phenylene-di-tetrabromophthalimide, N,N'-di-tetrabromophthalimidodiphenyl, N-(tetrabromophthalimido)-tetrabromophthalimide.

For the purpose of the invention, the following are particularly suitable: N-methyl-tetrachlorophthalimide, N,N'-ethylene-di-tetrachlorophthalimide.

For the purposes of the present invention, suitable glass fibers are all commercially available varieties and types of glass fibers. These include cut glass silk (long glass fibers and short glass fibers), rovings or staple fibers which may be rendered compatible with polycarbonates by means of suitable sizes. Before incorporation into the polycarbonate, the long glass fibers have a preferred length of between 6 mm and 3 mm, and in the case of short glass fibers, the preferred length is between 3 mm and 0.05 mm. The diameter of the preferred individual filaments is between 6 and 16 microns.

Two types of glass fibers are particularly preferred:

I. Long glass fibers having a mean fiber length of 6,000 microns, (μm), a diameter of 15 microns and a proportion of powder (50 μm) of approx. 1% by weight, and II. ground short glass fibers having a mean fiber length of 230 microns (μm), a diameter of 13 microns and a proportion of powder (50 μm) of 5% by weight.

The alkali-free aluminum boron silicate glass ("E glass") or even the alkali-containing "C glass" can be used as the glass material.

Sizes which are suitable for use are those known from the literature, and the water size known for short glass fibers (see DT-AS [German Published Specification] No. 1,201,991) has proved particularly suitable for polycarbonate compositions.

Further details concerning glass fibers and their use in plastics, in particular in polycarbonates, are disclosed in "Harro Hagen, Glasfaserverstarkte Kunststoffe" [Fiber-glass Reinforced Plastics], Springer-Verlag, Berlin, Gottingen, Heidelberg, 1961 (in particular pages 182–252) and in U.S. Pat. No. 3,577,378 (Ue-2159-Cip).

The additional bromine compounds to be employed according to the invention, both those employed as additives and those employed for condensation are known from the literature.

Suitable low molecular weight bromine compounds are low molecular weight polycarbonates (having a degree of polymerization of 3–10) based on tetrabromobisphenol A, decabromodiphenyl ether, decabromodiphenyl, pentabromophenoxyethane or di-(tribromophenyl) tetrabromophthalate.

Examples of compounds which contain aromatically bonded bromine and can be condensed into the aromatic polycarbonate are tetrabromobisphenol A, dibromobisphenol A, and p-bromophenol. These compounds are incorporated into the polycarbonate as diphenols or as chain terminators, in a known manner. They are employed in amounts from 0.2 to 30% by weight, relative to the total weight of the polycarbonate molding composition.

Preferred amounts of salts are 0.01 to 0.1% by weight, preferred amounts of phthalimides are 0.05 to 2% by weight, preferred amounts of glass fibers are 5 to 25% by weight and preferred amounts of bromine compounds are 0.2 to 20% by weight, relative in all cases to the total weight of the particular thermoplastic molding compositions.

The preparation of the molding compositions according to the invention can, for example, be carried out 1. by mixing the individual components simultaneously or successively, followed by extrusion, 2. by dissolving the polycarbonate in a suitable solvent such as methylene chloride or chlorobenzene, and then volatilizing the liquid phases, and subsequently adding the remaining components simultaneously or successively during the extrusion;

3. by preparing a concentration of the additives with a proportion of the polycarbonate and subsequently combining this with the remaining amounts of polycarbonate;

4. by mixing two concentrates as described, for example, in DT-OS [German Published Specification] No. 2,918,883 (LeA 19,569).

The molding compositions according to the invention can be processed, during or after their preparation, by the conventional thermoplastic processing methods, such as by extrusion, to give moldings and films having optimum flame retardance.

The flame-retardant polycarbonate molding compositions according to the invention may be admixed with other materials, such as antistatic agents, pigments, mold-release agents, thermal stabilizers or stabilizers to ultraviolet light.

The thermoplastic polycarbonate molding compositions according to the invention are employed in particular in the electrical sector.

The thermoplastic polycarbonate molding compositions or films according to the invention are distinguished by a combination of good properties, in particular, by the extreme flame retardance. In addition to the optimum flame retardance, in particular, the good processability and good optical properties in respect of gloss and transparency, coupled with polycarbonate-specific good mechanical properties which are present at the same time, should be mentioned.

The invention is further illustrated, but is not intended to be limited by the following examples in which all parts and percentages are by weight unless otherwise specified.

EXAMPLES

The aromatic polycarbonates on which the polycarbonate molding compositions according to the invention and the following examples are based are the following homopolymers which have been prepared by reaction of (A) 95.5 mol % of
2,2-bis-(4-hydroxyphenyl)-propane
4.0 mol % of phenol as a chain terminator
0.5 mol % of isatin-bis-cresol as a branching agent with phosgene
(B) 90.0 mol % of 2,2-bis-(4-hydroxyphenyl)-propane
5.5 mol % of 2,2-bis-(3,5-dibromo-4-hydroxyphenyl)-propane
4.0 mol % phenol as chain terminator, 0.5 mol % of isatin-bis-cresol as a branching agent with phosgene by the two-phase boundary process, with sodium hydroxide and triethylamine, under standard conditions.

The relative solution viscosity of these polycarbonates was: A=1.35, B=1.33, measured at 25° C. in a 0.5% strength by weight solution in methylene chloride.

The polymers obtained were extruded at 300° C. and granulated. These granules were used to prepare the polycarbonate molding compositions according to the invention by admixing the additive combinations listed in the examples which follow. The granules obtained by this extrusion run were formed, in an injection molding process at 300°–320° C., into (a) test plates measuring 300 mm×300 mm×3 mm, and into (b) test bars measuring 127×12.7×0.8 mm; 127×12.7×1.6 mm; 127×12.7×3.2 mm.

Furthermore, some of the granules obtained were extruded to give plates (c).

I. Test of tendency to drip, carried out on plates subjected to strong flaming.

The test plates (a) were subjected to a special burning test which makes it possible to recognize the dripping parts.

According to this test method, the plates were clamped on an asbestos frame and were flamed from a lower corner, at an angle of 45°, using a propane hand burner (Lorch, type 1001; through-put amount 120 liters of propane per hour, the air-intake holes of the burner are completely open), the distance from the steel barrel of the burner to the sample being 60 mm. Flaming is terminated after 3 minutes.

II. Burning test according to Underwriters Laboratories Inc., Bulletin 94.

The test bars (b) (10 samples for each additive combination listed) were subjected to the test method according to Underwriters Laboratories, Inc., Bulletin 94, burning test for the classification of materials.

According to this test method, the materials tested in this manner were classified either as UL-94 V-O, UL-94 V-I and UL-94 V-II, and this was done on the basis of the results obtained with the 10 test bars. The criteria for each of these classifications are briefly stated as follows:

UL-94 V-O The average flaming and/or glowing after removal of the igniting flame should not exceed 5 seconds, and none of the samples should drip particles which ignite absorbent cotton.

UL-94 V-I The average flaming or glowing after removal of the igniting flame should not exceed 25 seconds, and none of the samples should drip particles which ignite absorbent cotton.

UL-94 V-II The average flaming or glowing after removal of the igniting flame should not exceed 25 seconds, and the samples drip burning particles which ignite absorbent cotton.

III. Burning test according to Federal Aviation Regulation—FAR 25.853.a.

A part (c) of the granules obtained—as described further above—was processed by an extrusion process at 290°–310° C. to give plates of 1.5 mm and 3.0 mm thickness. Samples of the following dimensions were cut out from these plates:
350×75×1.5 mm 350×75×3.0 mm.

These test plates (three for each additive combination) were tested in respect to their burning characteristics, according to the guidelines of the Federal Aviation Regulation—FAR 25.853.a.

According to this test method, the samples were assessed in terms of the following properties:

1. subsequent burning times of the burning drops which have fallen off, (=M 1),
2. subsequent burning times of the burning samples (=M 2) and,
3. Length of samples destroyed (=M 3).

The mean values should not exceed the following values:

M 1<3 sec.
M 2<15 sec.

If one of the three mean values is exceeded, the test has not been passed.

The results of the burning tests are summarized in the tables which follow.

| Serial Number | Polycarbonate type used | Additive Combination | I. Test of tendency to drip carried out on plates subjected to strong flaming (a) | II. Burning characteristics according to UL subject 94 (b) |
|---|---|---|---|---|
| 1 | A | — | drips burning particles | 1.6 mm V 2 |
| 2 | A | 0.06% by weight of potassium perfluoro-butane-sulphonate 10.8% by weight of oligocarbonate of 2,2-bis-(3,5-dibromo-4-hydroxy-phenyl)-propane | drips burning particles | 3.2 mm V 2 0.8 mm V 2 1.6 mm V 0 3.2 mm V 0 |
| 3 | A | 0.06% by weight of potassium perfluoro-butane-sulphonate 10.8% by weight of oligocarbonate of 2,2-bis-(3,5-dibromo-4-hydroxy-phenyl)-propane 0.5% by weight of N—methyl-tetrachlorophthalimide | does not drip | 0.8 mm V 0 1.6 mm V 0 3.2 mm V 0 |
| 4 | A | 0.06% by weight of potassium perfluoro-butane-sulphonate 9.0% by weight of bis-1,2-di-(tetrabromophthalimido)-ethane 0.50% by weight of N—methyltetrachlorophthalimide | does not drip | 0.8 mm V 0 1.6 mm V 0 3.2 mm V 0 |
| 5 | B | 0.06% by weight of potassium perfluorobutane-sulphonate 0.5% by weight of N—methyltetrachlorophthalimide | does not drip | 0.8 mm V 0 1.6 mm V 0 3.2 mm V 0 |
| 6 | B | 15% by weight of glass fibers (diameter = 10–15μ; L = 200–250μ) 0.06% by weight of potassium perfluorobutane sulphonate 0.05% by weight of N—methyltetrachlorophthalimide | does not drip | 0.8 mm V 0 1.6 mm V 0 3.2 mm V 0 |

| Serial Number | Polycarbonate type used | Additive combination | III. Burning characteristics according to FAR 25.853.a. (c) | II. Burning characteristics according to UL subject 94 (a) |
|---|---|---|---|---|
| 7 | A | 0.06% by weight of potassium perfluoro-butane-sulphonate 1.0% by eight of decabromodiphenyl ether | thickness = 1.5 mm M 1: 5 sec. M 2: 12 sec. M 3: 121 mm failed  thickness = 3.0 mm M 1: 6 sec. M 2: 9 sec. M 3: 118 mm failed | 0.8 mm V 2 1.6 mm V 0 3.2 mm V 0 |
| 8 | A | 0.06% by weight of potassium perfluoro-butane-sulphonate 1.0% by weight of N—methyltetrachloro-phthalimide | thickness = 1.5 mm M 1: 6 sec. M 2: 11 sec. M 3: 111 mm failed  thickness = 3.0 mm | 0.8 mm V 2 1.6 mm V 0 3.2 mm V 0 |

| | | -continued | |
|---|---|---|---|
| | | | M 1: 8 sec. |
| | | | M 2: 10 sec. |
| | | | M 3: 108 mm |
| | | | failed |
| 9 | A | 0.06% by weight of | thickness = 1.5 mm |
| | | potassium perfluoro-butane-sulphonate | M 1: 0 sec. 0.8 mm V 0 |
| | | | M 2: 10 sec. 1.6 mm V 0 |
| | | 0.60% by weight of | M 3: 108 mm 3.2 mm V 0 |
| | | decabromodiphenyl ether | passed |
| | | 0.40% by weight of | thickness = 3.0 mm |
| | | N—methyltetrachloro-phthalimide | M 1: 0 sec. |
| | | | M 2: 8 sec. |
| | | | M 3: 110 mm |
| | | | passed |
| 10 | A | 0.06% by weight of | thickness = 1.5 mm |
| | | potassium perfluoro-butane sulfonate | M 1: 0 sec. 0.8 mm V 0 |
| | | | M 2: 8 sec. 1.6 mm V 0 |
| | | 0.50% by weight of | M 3: 108 mm 3.2 mm V 0 |
| | | decabromodiphenyl ether | passed |
| | | 0.50% by weight of | thickness = 3.0 mm |
| | | N—methyltetrachloro-phthalimide | M 1: 0 sec. |
| | | | M 2: 6 sec. |
| | | | M 3: 107 mm |
| | | | passed |

What is claimed is:

1. A molding composition comprising
   (a) a branched thermoplastic aromatic polycarbonate,
   (b) an alkali or an alkaline earth metal salt of an organic or an inorganic acid
   (c) a tetrahalogenophthalimide of the general formula I or II

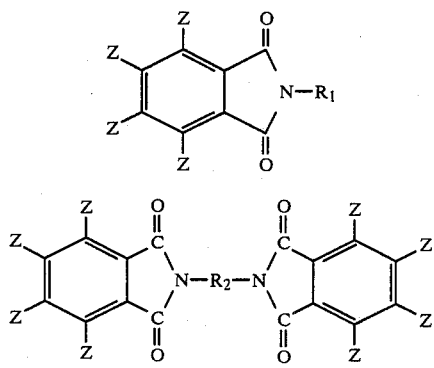

wherein $R_1$ denotes a hydrogen atom, $C_1$–$C_4$ alkyl, $C_6H_5$, $C_{10}H_7$, $C_6H_4X$, $C_6H_3X_2$ or $C_6H_2X_3$ where X is chlorine or bromine and wherein $R_2$ is a bond, $C_2$–$C_8$ alkylene, $C_6H_4$ or p-diphenylene, and wherein Z is chlorine or bromine characterized in that it contains about 0.1 to about 7 percent relative to the weight of the composition of requisite bromine, said requisite bromine being obtained by either condensing into said (a) monomeric compounds containing aromatically bonded bromine or by admixing with said (a) a member selected from the group consisting of decabromodiphenyl ether, decabromodiphenyl, pentabromophenoxyethane di(tribromophenyl) tetrabromophthalate and low molecular weight polycarbonate based on tetrabromobisphenol A, provided that said (b) is present in an amount of from about 0.01 to about 1 percent, said (c) is present in an amount of from about 0.05 to about 5 percent and said monomeric compounds are condensed or said member is added at an amount of between about 0.5 and about 30 percent, said percents being relative to the weight of said composition.

2. The composition of claim 1 wherein said monomeric compounds that are condensed or said member are used at an amount of between 0.5 and about 20 percent, relative to the weight of said composition.

3. The composition of claim 2 further comprising 1 to 40 percent by weight, relative to the composition, of glass fibers.

4. A molding composition consisting essentially of
   (a) a branched thermoplastic aromatic polycarbonate,
   (b) an alkali or an alkaline earth metal salt of an organic or an inorganic acid
   (c) a tetrahalogenophthalimide of the general formula I or II

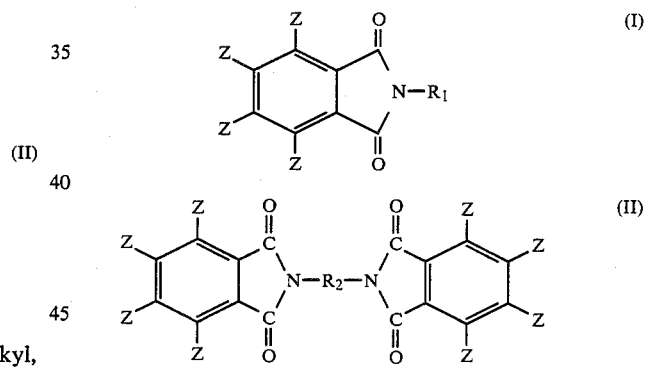

wherein $R_1$ denotes a hydrogen atom, $C_1$–$C_4$ alkyl, $C_6H_5$, $C_{10}H_7$, $C_6H_4X$, $C_6H_3X_2$ or $C_6H_2X_3$ where X is chlorine or bromine and wherein $R_2$ is a bond, $C_2$–$C_8$ alkylene, $C_6H_4$ or p-diphenylene, and wherein Z is chlorine or bromine characterized in that it contains about 0.1 to about 7 percent relative to the weight of the composition of requisite bromine, said requisite bromine being obtained by either condensing into said (a) monomeric compounds containing aromatically bonded bromine or by admixing with said (a) a member selected from the group consisting of decabromodiphenyl ether, decabromodiphenyl, pentabromophenoxyethane, 1,2-di(tetrabromophthalimido)-ethane, di(tri-bromophenyl) tetrabromophthalate and low molecular weight polycarbonate based on tetrabromobisphenol A, provided that said (b) is present in an amount of from about 0.01 to about 1 percent, said (c) is present in an amount of from about 0.05 to about 5 percent and said monomeric compounds are condensed or said member is added at an amount of between about 0.5 and about 20 percent, said percents being relative to the weight of said composition.

* * * * *